(12) United States Patent
Howarth et al.

(10) Patent No.: US 11,781,534 B2
(45) Date of Patent: *Oct. 10, 2023

(54) COMPACT SMA ACTUATOR (71) Applicant: CAMBRIDGE MECHATRONICS LIMITED, Cambridge (GB)

(72) Inventors: James Howarth, Cambridge (GB); Andrew Benjamin Simpson Brown, Cambridge (GB); Robin Eddington, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,301

(22) Filed: Sep. 16, 2022

(65) Prior Publication Data

US 2023/0014977 A1 Jan. 19, 2023

Related U.S. Application Data

(63) Continuation of application No. 16/612,546, filed as application No. PCT/EP2018/062211 on May 11, 2018, now Pat. No. 11,448,201.

(30) Foreign Application Priority Data

May 11, 2017 (GB) ..................... 1707542

(51) Int. Cl.
*F03G 7/06* (2006.01)
*G02B 27/64* (2006.01)
*G03B 3/10* (2021.01)
*G03B 5/00* (2021.01)

(52) U.S. Cl.
CPC ........... *F03G 7/065* (2013.01); *F03G 7/0614* (2021.08); *G02B 27/64* (2013.01); *G03B 3/10* (2013.01); *G03B 5/00* (2013.01)

(58) Field of Classification Search
CPC ......... F03G 7/0614; G02B 27/64; G03B 3/10; G03B 5/00
USPC ........... 60/527–529; 359/554–557, 694–706, 359/813–814, 822–826
See application file for complete search history.

(56) References Cited

U.S. PATENT DOCUMENTS

| | | | |
|---|---|---|---|
| 9,609,219 B2 | 3/2017 | Howarth et al. | |
| 11,448,201 B2* | 9/2022 | Howarth | ............... G02B 27/64 |
| 2004/0112049 A1 | 6/2004 | Behrens et al. | |

(Continued)

FOREIGN PATENT DOCUMENTS

| | | |
|---|---|---|
| CN | 103677076 A | 3/2014 |
| CN | 104204935 A | 12/2014 |
| JP | 2001-263221 A | 9/2001 |

*Primary Examiner* — Hoang M Nguyen
(74) *Attorney, Agent, or Firm* — Haley Guiliano LLP (57) ABSTRACT

Broadly speaking, embodiments of the present techniques provide an actuator that comprises segments of shape memory alloy (SMA) actuator wire that can be used to deliver a relatively large output stroke. In particular, two segments of SMA actuator wire may be mechanically coupled together around a corner of a static component of the actuator such that a displacement (e.g. contraction) of one segment causes a displacement (e.g. contraction) of the other segment. In this way, the displacement of each segment combines in an additive manner to generate a large output stroke that is able to move a moveable component of the actuator.

20 Claims, 6 Drawing Sheets

(56) References Cited

U.S. PATENT DOCUMENTS

| | | |
|---|---|---|
| 2011/0102920 A1 | 5/2011 | Shyu et al. |
| 2011/0179786 A1 | 7/2011 | Topliss et al. |
| 2011/0249131 A1 | 10/2011 | Topliss et al. |
| 2011/0279916 A1 | 11/2011 | Brown et al. |
| 2014/0060036 A1 | 3/2014 | Gao et al. |
| 2015/0135703 A1 | 5/2015 | Eddington et al. |
| 2015/0304561 A1 | 10/2015 | Howarth et al. |
| 2015/0346507 A1 | 12/2015 | Howarth |

* cited by examiner

COMPACT SMA ACTUATOR

CROSS-REFERENCE TO RELATED APPLICATIONS

This application is a continuation of U.S. patent application Ser. No. 16/612,546, filed Nov. 11, 2019, which is a national stage application under 35 U.S.C. § 371 of International Application PCT/EP2018/062211, filed May 11, 2018, which claims priority of GB Patent Application 1707542.5, filed May 11, 2017. The disclosures of which are hereby incorporated by reference herein in their entireties.

The present application generally relates to a shape memory alloy (SMA) based actuator, and in particular to a compact actuator that uses segments of SMA actuator wire that are linked together to deliver a relatively large output stroke.

The present techniques provide an actuator comprising: a static component; at least one moveable component moveable relative to the static component; at least one shape memory alloy (SMA) actuator wire coupled to the static component and the moveable component, where a first segment of SMA actuator wire is provided on a first side of the static component, and a second segment of SMA actuator wire is provided on a second side of the static component, the second side being adjacent to the first side; wherein the first and second segments of SMA actuator wire are mechanically coupled together in series at a corner of the static component located where the first and second sides meet, whereby contraction of the segments of SMA actuator wire additively combine to generate a total contraction that moves the moveable component.

Preferred features are set out in the appended dependent claims.

Implementations of the present techniques will now be described, by way of example only, with reference to the accompanying drawings, in which.

Broadly speaking, embodiments of the present techniques provide an actuator that comprises segments of shape memory alloy (SMA) actuator wire that can be used to deliver a relatively large output stroke. In particular, two segments of SMA actuator wire may be mechanically coupled together around a corner of a static component of the actuator such that a displacement (e.g. contraction) of one segment causes a displacement (e.g. contraction) of the other segment. In this way, the displacement of each segment combines in an additive manner to generate a large output stroke that is able to move a moveable component of the actuator. This arrangement of SMA actuator wire (or segments thereof) may overcome one of the problems of known SMA materials—the relatively small amount of contraction (about 8%) that is achieved upon heating an SMA material past the transition temperature. Accordingly, the larger the required displacement (e.g. of a moveable component of the actuator), the longer the SMA actuator wire needed to achieve the displacement. Long lengths of SMA actuator wire may not be practical in certain applications and may also increase the overall cost of an actuator. Therefore, the present techniques provide a solution to this problem.

The actuators described herein may be used in any scenario where a large movement/displacement of a moveable component of an actuator is required, but where it is not practical to provide long lengths of SMA actuator wire (e.g. where the actuator needs to be compact or miniature).

One example use for the actuator of the present techniques may be in an image capture device. The actuators described herein may be incorporated into an image capture device, and used to move an optical element such that it at least partly covers an aperture of the image capture device. The optical element may be a shutter that may be able to reduce the total amount of light passing through the aperture of the image capture device. The shutter may be able to fully open, partly open, and/or fully close. The optical element may be a filter that may be able to block certain wavelengths of light from passing through the aperture of the image capture device. In an example, the filter may be an infrared cut-off filter.

Many image capture devices (e.g. cameras) have an infrared filter that is located in the optical path to ensure that infrared radiation does not interfere with the image. Digital image sensors, such as CCD and CMOS sensors, have sensitivities extending into the near-infrared. Without an IR cut-off filter, images may look unnatural, and so cameras may include an IR cut-off filter.

Image capture devices may be used as part of a security system. For example, image capture devices (such as the cameras of smartphones) may be used to perform iris recognition as part of some security process. Generally speaking, a camera is used to image a person's eye to verify the person's identity, since each human iris is unique. Iris recognition may be carried out with near infrared illumination. Hence for this purpose, an IR cut-off filter may not be required. Accordingly, to enable a single image capture device to be useable for multiple purposes, such as for taking images and for iris recognition, it may be desirable to provide an actuator mechanism which is capable of moving, for example, an IR filter in and out of the optical path depending on which function the image capture device is being used for.

With respect to existing image capture devices (e.g. video and TV cameras), mechanisms have been provided to move IR cut-off filters out of the optical path, such that IR radiation can be used for imaging for example in low-light or darkness conditions. For example, U.S. Pat. No. 5,070,407A describes a video camera having an IR cut-off filter disc and a neutral filter disc that are held in a rotatable plate, which is powered to rotate by a mechanism such as a solenoid to switch the desired filter into the optical path. A similar feature is described for a handheld camera in U.S.

Pat. No. 7,715,115B2, which uses a stepper motor to linearly move filters. These actuator devices comprise relatively large components (such as a solenoid or stepper motor) and are therefore unsuitable for providing a compact actuator that could be incorporated into, for example, portable devices such as smartphones.

IR filter switching mechanisms have also been proposed for miniature cameras (e.g. the cameras of smartphones), using an electromagnetic voice coil motor (VCM), as described in U.S. Pat. Nos. 9,164,356 and 8,131,144, for example. However, there is a limit to how much the magnets and coils of a VCM actuator can be miniaturised. In particular, for a filter-switching mechanism, the VCM may add about 1 mm to the thickness (height) of a camera module. The smartphone market calls for ever-thinner phone handsets and therefore, a height addition of 1 mm is highly undesirable.

The present applicant has pioneered the use of shape memory alloy (SMA) actuators in miniature cameras. Such actuators work on the basis of electrically heating an SMA actuator wire to cause it to contract. As such, the actuators are very small, since they comprise only fine wire, of for example 25 micron diameter, and appropriate connections. The present applicant has proposed SMA actuator designs for autofocus mechanisms (see for example International Patent Publication No. WO2007/113478) and for Optical Image Shake Correction (OIS) mechanisms (see for example International Patent Publication Nos. WO2010/029316 and WO2013/175197). While these actuator designs provide fine control and accurate positioning, they produce insufficient displacement to move an IR filter into and out of the optical path.

The present techniques are now described with reference to the Figures.

Figure 1:
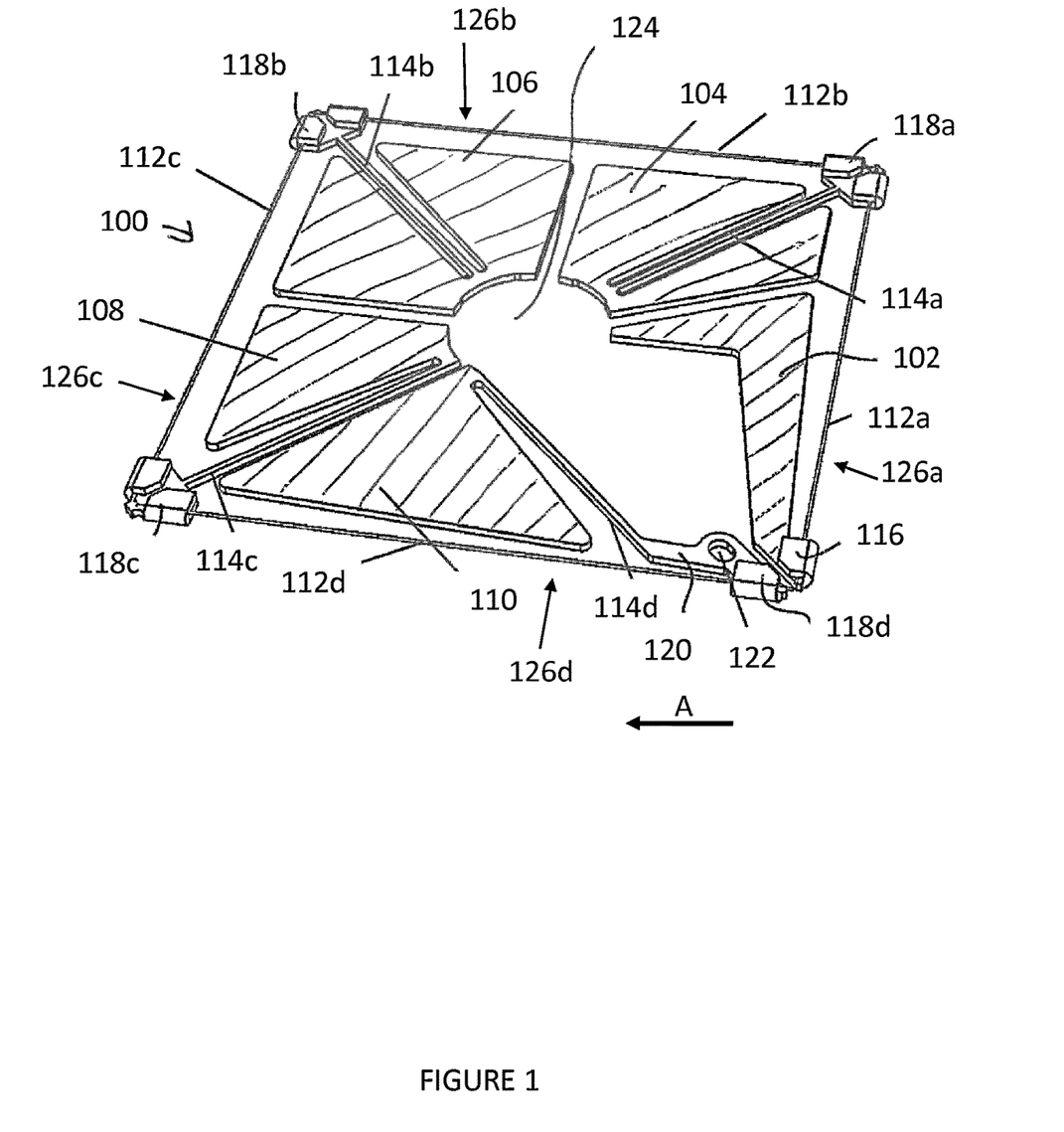
FIG. 1 shows a perspective view of a static component of an actuator and a first mechanism for moving a moveable component of an actuator relative to the static component.

FIG. 1 shows a perspective view of a static component 100 of an actuator and a first mechanism for moving a moveable component (not shown) of an actuator relative to the static component. The static component 100 may comprise five base portions 102, 104, 106, 108, and 110 which are substantially flat and are arranged in a plane as shown. The base portions 102-110 may be fixedly coupled to a substrate (shown in FIG. 2). In embodiments where the actuator is provided to move an optical element into/out of an optical path through a camera, the base portions 102-110 may be shaped and/or arranged such that form an aperture 124 in the static component 100. Aperture 124 may also be present in the substrate to which the base portions 102-110 are coupled. The base portions 102-110 may be arranged to form a quadrilateral shape as shown. The substrate to which the base portions 102-110 are coupled may dictate the overall shape of the static component 100. It will be understood that the shape of the static component 100 may be adapted to suit the purpose of the actuator (i.e. what it might be used for or the device into which it may be incorporated).

Base portion 102 may comprise a crimp component 116. The base portion 102 may be arranged such that crimp component 116 may be provided at a corner of the static component 100. Base portion 102 and crimp component 116 may be fixedly coupled to the substrate and unable to move. Crimp component 116 may be used to grip an end of a shape memory alloy (SMA) actuator wire or a segment of SMA actuator wire 112a which runs along side/edge 126a of the static component 100. Crimp component 116 may be electrically coupled to a power supply such that electrical current may flow along the segment 112a of SMA actuator wire. It will be understood that crimp component 116 may be any suitable element for mechanically and electrically coupling to the SMA actuator wire segment 112a.

Base portion 104 may comprise a corner element at each corner of the base portion for coupling or guiding the SMA actuator wire portions. In embodiments, the corner element may be a flexure 114a. In embodiments, the flexure 114a may be an elongate flexure. One end of the flexure 114a may extend to a corner of the static component 100, at the point at which sides 126a and 126b of the static component 100 meet. The flexure 114a may comprise, or be coupled to, a crimp component 118a. Alternatively, flexure 114a may be shaped at the end of the flexure which is at the corner of the static component 100, such that it forms a clasp or hook. It will be understood that where a flexure is referred to herein as comprising or being coupled to a crimp component, the flexure may alternatively be shaped to have a clasp or hook portion for gripping, holding or guiding SMA actuator wire. Thus, the flexure may be able to couple together separate pieces of SMA actuator wire or may be able to hold a single piece of SMA actuator wire. The crimp component 118a may be provided at the corner of the static component 100 where sides 126a and 126b meet. Base portion 104 may be fixedly coupled to the substrate and unable to move, but the flexure 114a (and crimp 118a/clasp) may not be coupled to the substrate and as such, may be able to move freely relative to the base portion 104. Crimp component 118a may be used to grip the ends of two segments of SMA actuator wire 112a, 112b, which are provided along sides 126a and 126b respectively. Where segments 112a and 112b are segments of a continuous piece of SMA actuator wire, the actuator wire may be provided in the clasp or hook portion of flexure 114a. Crimp component/clasp 118a may be electrically coupled to a power supply such that electrical current may flow along segments 112a, 112b of SMA actuator wire. When current is passed along SMA actuator wire segment 112a, the segment 112a contracts and the contraction causes movement/displacement of crimp component 118a, which is able to move because of flexure 114a. Specifically, the crimp component 118a moves towards crimp component 116.

Base portion 106 may comprise a corner element at each corner of the base portion for coupling or guiding the SMA actuator wire portions. In embodiments, one corner element may be a flexure 114b. In embodiments, the flexure 114b may be an elongate flexure. One end of the flexure 114b may extend to a corner of the static component 100, at the point at which sides 126b and 126c of the static component 100 meet. The flexure 114b may comprise, or be coupled to, a crimp component 118b. Alternatively, flexure 114b may be shaped at the end of the flexure which is at the corner of the static component 100, such that it forms a clasp or hook, as explained above. The crimp component 118b may be provided at the corner of the static component 100 where sides 126b and 126c meet. Base portion 106 may be fixedly coupled to the substrate and unable to move, but the flexure 114b (and crimp/clasp 118b) may not be coupled to the substrate and as such, may be able to move freely relative to the base portion 106. Crimp component 118b may be used to grip the ends of two segments of SMA actuator wire 112b, 112c, which are provided along sides 126b and 126c respectively. Where segments 112b and 112c are segments of a continuous piece of SMA actuator wire, the actuator wire may be provided in the clasp or hook portion of flexure 114b. Crimp component/clasp 118b may be electrically coupled to a power supply such that electrical current may flow along segments 112b, 112c of SMA actuator wire.

When current is passed along SMA actuator wire segment 112a, the segment 112a contracts and the contraction causes movement/displacement of crimp component 118*a*, which is able to move because of flexure 114*a*. Specifically, the crimp component 118*a* moves towards crimp component 116. The movement of crimp component 118*a* also causes movement/displacement of crimp component 118*b*, which is able to move because of flexure 114*b*. Thus, movement of crimp component 118*b* occurs before current is passed along SMA actuator wire segment 112*b*. When current is passed along SMA actuator segment 112*b*, the segment 112*b* contracts and the contraction causes further movement/displacement of crimp component 118*b* (in a direction towards crimp component 118*a*). In this way, the crimp component 118*b* is caused to move by the contraction of SMA actuator wire segment 112*a* and 112*b*. Thus, the amount by which segments 112*a* and 112*b* contract may add up to the amount by which crimp component 118*b* is displaced.

Base portion 108 may comprise a corner element at each corner of the base portion for coupling or guiding the SMA actuator wire portions. In embodiments, one corner element may be a flexure 114*c*. In embodiments, the flexure 114*c* may be an elongate flexure. One end of the flexure 114*c* may extend to a corner of the static component 100, at the point at which sides 126*c* and 126*d* of the static component 100 meet. The flexure 114*c* may comprise, or be coupled to, a crimp component 118*c*. Alternatively, flexure 114*c* may be shaped at the end of the flexure which is at the corner of the static component 100, such that it forms a clasp or hook, as explained above. The crimp component 118*c* may be provided at the corner of the static component 100 where sides 126*c* and 126*d* meet. Base portion 108 may be fixedly coupled to the substrate and unable to move, but the flexure 114*c* (and crimp/clasp 118*c*) may not be coupled to the substrate and as such, may be able to move freely relative to the base portion 108. Crimp component 118*c* may be used to grip the ends of two segments of SMA actuator wire 112*c*, 112*d*, which are provided along sides 126*c* and 126*d* respectively. Where segments 112*c* and 112*d* are segments of a continuous piece of SMA actuator wire, the actuator wire may be provided in the clasp or hook portion of flexure 114*c*. Crimp component/clasp 118*c* may be electrically coupled to a power supply such that electrical current may flow along segments 112*c*, 112*d* of SMA actuator wire.

Contraction of SMA actuator wire segment 112*a* causes displacement of crimp component 118*a*, which in turn causes displacement of crimp component 118*b*, which in turn causes displacement of crimp component 118*c*. Thus, movement of crimp component 118*c* occurs before current is passed along SMA actuator wire segment 112*c*. When current is passed along SMA actuator segment 112*c*, the segment 112*c* contracts and the contraction causes further movement/displacement of crimp component 118*c* (in a direction towards crimp component 118*b*). In this way, the crimp component 118*c* is caused to move by the contraction of SMA actuator wire segments 112*a*-112*c*. Thus, the amount by which segments 112*a*-*c* contract may add up to the amount by which crimp component 118*c* is displaced.

Base portion 110 may comprise a corner element at each corner of the base portion for coupling or guiding the SMA actuator wire portions. In embodiments, one corner element may be a flexure 114*d*. In embodiments, the flexure 114*d* may be an elongate flexure. One end of the flexure 114*d* may extend to a corner of the static component 100, at the point at which sides 126*a* and 126*d* of the static component 100 meet. The flexure 114*d* may comprise, or be coupled to, a crimp component 118*d*. Alternatively, flexure 114*d* may be shaped at the end of the flexure which is at the corner of the static component 100, such that it forms a clasp or hook, as explained above. The crimp component 118*d* may be provided at the corner of the static component 100 where sides 126*a* and 126*d* meet. Base portion 110 may be fixedly coupled to the substrate and unable to move, but the flexure 114*d* (and crimp/clasp 118*d*) may not be coupled to the substrate and as such, may be able to move freely relative to the base portion 110. Crimp component 118*d* may be used to grip an end of SMA actuator wire segment 112*d*, which is provided along side 126*d*. Crimp component/clasp 118*d* may be electrically coupled to a power supply such that electrical current may flow along segments 112*d* of SMA actuator wire.

Contraction of SMA actuator wire segment 112*a* causes displacement of crimp component 118*a*, which in turn causes displacement of crimp component 118*b*, which in turn causes displacement of crimp component 118*c*, and which in turn causes displacement of crimp component 118*d*. Thus, movement of crimp component 118*d* occurs before current is passed along SMA actuator wire segment 112*d*. When current is passed along SMA actuator segment 112*d*, the segment 112*d* contracts and the contraction causes further movement/displacement of crimp component 118*d* (in a direction towards crimp component 118*c*). In this way, the crimp component 118*d* is caused to move by the contraction of SMA actuator wire segments 112*a*-112*d*. Thus, the amount by which segments 112*a*-*d* contract may add up to the amount by which crimp component 118*d* is displaced.

The base portions 102-110 may be formed from any suitable material. In embodiments, the base portions 102-110 may be formed from an electrically conductive material, such as sheet metal. In embodiments, the base portions 102-110 may be formed from an electrically insulative material, but flexures 114*a*-*d* (and their hook/clasp portions, if present) may be formed from an electrically conductive material. In embodiments, the base portions 102-110 and flexures 114*a*-*d* may be formed from an electrically insulative material, but crimp components 116, 118*a*-118*d* and 120 may be formed from an electrically conductive material to enable current to from a power source along the segments of SMA actuator wire 112*a*-*d*. The base portions 102-110 may be fixedly coupled to the substrate by any suitable fixing means such as gluing, adhesive, welding or otherwise.

Flexure 114*d* may connect to crimp component 118*d* via a land 120. The land 120 may have an elongate hole or slot 122 located near the crimp component 118*d*. The slot 122 may receive a post or pin of the moveable component of the actuator such that the moveable component becomes coupled to flexure 114*d*. Thus, movement of flexure 114*d* may cause movement of the moveable component of the actuator. This is described in more detail with reference to FIG. 2.

Base portions 102-110 may be connected to an electrical power supply. When current is passed through the base portions, the current may flow through each SMA actuator wire segment 112*a*-*d* and heat all four segments. Each segment may contract and cause the flexures 114*a*-*d* to flex/bend. Each flexure 114*a*-*d* may move further than the previous flexure as the SMA wire contractions add together, as explained above. The movement of the final flexure 114*d* causes movement of the slot 122 and this movement is hence the sum of all the wire segment contractions. The slot 122 moves in the direction of the arrow A.

Thus, the present techniques provide a very compact actuator which has a relatively large output stroke and therefore can be used to move objects by large amounts. The large displacement is achieved through the relatively long length of SMA wire, which extends almost all the way around the static component 100 of the actuator. In embodiments, one continuous piece of SMA actuator wire may be used and provided all the way around the static component 100, such that a segment of the SMA actuator wire is provided on each side 112a-d. In embodiments, multiple segments of SMA actuator wire may be provided. For example, four segments of SMA actuator wire may be used, such that one segment is provided on each side 112a-d. It will be understood that these are merely two illustrative examples, and any number of segments of SMA actuator wire may be used. The segments of SMA actuator wire are arranged so that the displacement/contraction of the individual segments is additive. The height of the actuator may be minimal, because the actuator comprises SMA actuator wire, which has a thickness of around 25 μm, and connecting features, such as crimps, which may have a low height. The total actuator height may therefore be below 500 μm, which is very much less than that of known VCM actuators.

Thus, the present techniques provide an actuator comprising: a static component; at least one moveable component moveable relative to the static component; a first segment of shape memory alloy (SMA) actuator wire provided on a first side of the static component; and a second segment of SMA actuator wire provided on a second side of the static component, the second side being adjacent to the first side; wherein the first and second segments of SMA actuator wire are mechanically coupled together in series at a corner of the static component located where the first and second sides meet, whereby contraction of the segments of SMA actuator wire additively combine to generate a total contraction that moves the moveable component.

The static component may comprise a corner element located at the corner where the first and second sides meet.

The corner element may be a flexure which mechanically couples together the first and second segments of SMA actuator wire at the corner of the static component, wherein contraction of the first segment of SMA actuator wire causes bending of the flexure and displacement of the second segment of SMA actuator wire.

The flexure may comprise a crimping component for mechanically coupling together the first and second segments of SMA actuator wire. Alternatively, the first and second segments of SMA actuator wire may be segments of a single continuous piece of SMA actuator wire, and the flexure may comprise a clasp or hook portion. In this case, the single continuous piece of SMA actuator wire may be provided in the clasp portion of the flexure.

Figure 2:
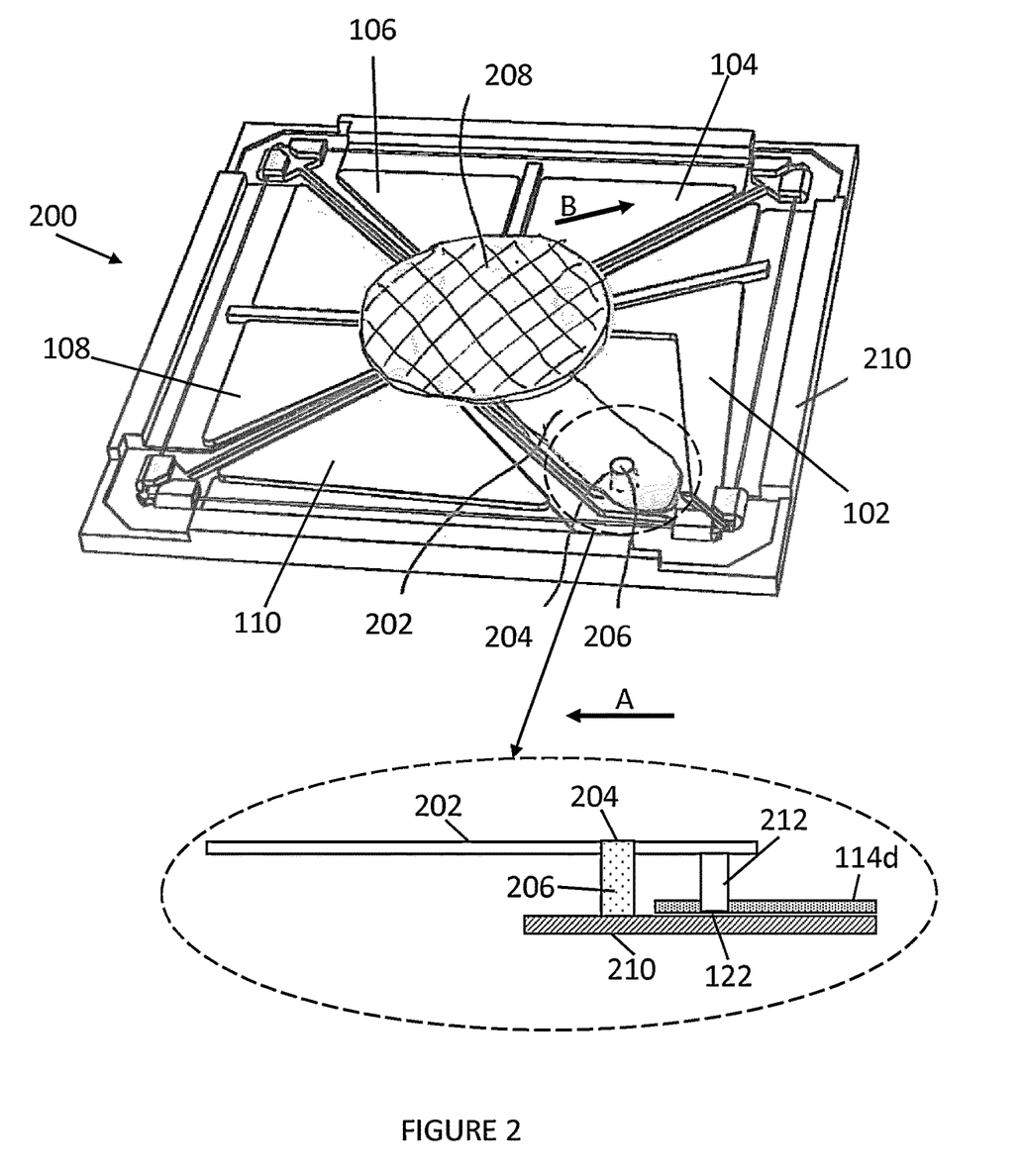
FIG. 2 shows a perspective view of an example moveable component of an actuator coupled to the static component of FIG. 1.

FIG. 2 shows a perspective view of an example moveable component 202 of an actuator coupled to the static component 100 of FIG. 1. For the sake of simplicity, only those features which are new relative to FIG. 1 are described here. The base portions 102-110 are fixedly coupled (as described above) to substrate 210. The moveable component 202 in the embodiment shown in FIG. 2 has the form of an arm or lever arm. The lever arm 202 may be coupled to the static component 100 in two ways. As shown in the main image and the inset zoomed view of the side of the lever arm 202, the lever arm 202 comprises a hole 204 and comprises a pin 212. The pin 212 is insertable into slot 122 of flexure 114d. The substrate 210 comprises a pivot post 206, which extends from the substrate 210 towards the lever arm 202. The pivot post 206 locates in hole 204 of the lever arm 202. The moveable component/lever arm 202 may be able to rotate about the pivot post 206. When the segments of SMA actuator wire 112a-d contract, slot 122 is caused to move (as described above), which causes pin 212 to move. Movement of pin 212 causes the movable component 202 to move in the direction of the arrow A and rotate about the pivot post 206.

In embodiments, the moveable component 202 may comprise, or be coupled to, an optical element 208. The optical element 208 may be provided at a distal end of the lever arm 202, with respect to the end of the lever arm 202 which is coupled to pivot post 206. The optical element may be a shutter or an optical filter, for example. The movement of moveable component 202 causes the optical element 208 to rotate in the direction of arrow B, thereby moving the optical element 208 away from the aperture 124 and thus, out of the optical path.

Turning briefly back to FIG. 1, the flexures 114a-d are shown as being at particular angles relative to the corners of the static component 100. For example, the flexures 114a-d could each be at a 45° angle relative their respective corner. However, it may be advantageous to provide one or more of the flexures 114a-d at a different angle to vary the total (combined) displacement. In embodiments, it may be useful to have the final flexure 114d (i.e. the flexure coupled to the moveable component) at a different angle from all the other flexures 114a-c such that amount by which the moveable component is displaced is maximised.

The static component 100 may comprise a corner element at the corner where the first and second sides meet. In the embodiments shown in FIGS. 1 and 2, the corner element may be a flexure 114a having a crimping component 118a for mechanically coupling together the first and second segments of SMA actuator wire 112a,b at the corner of the static component 100, wherein contraction of the first segment of SMA actuator wire 112a causes bending of the flexure 114a and displacement of the second segment of SMA actuator wire 112b.

In FIG. 1, the segments of SMA actuator wire 112a-d are shown as being crimped in crimp components 116 and 118a-d, and being provided around the four sides 126a-d of the static component. We now describe alternative ways to provide the SMA actuator wire in the static component with respect to FIGS. 3 to 5.

Figure 3:
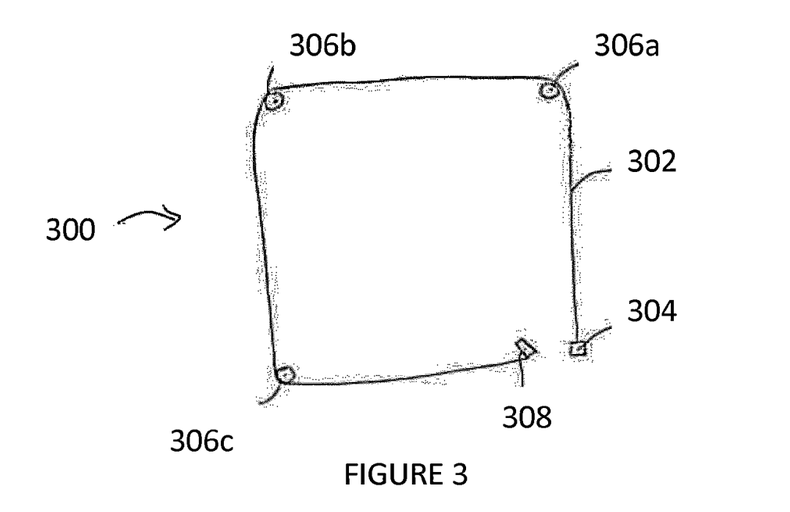
FIG. 3 shows a plan view of a second mechanism for moving a moveable component of an actuator relative to a static component of the type shown in FIG. 1.

FIG. 3 shows a plan view of a second mechanism 300 for moving a moveable component of an actuator relative to a static component 100 of the type shown in FIG. 1. Here, the corner components of FIG. 1 (i.e. flexures 114a-d and crimp components 118a-c) are replaced by different types of corner component, namely pulley wheels 306a-306c. A single SMA actuator wire 302 is provided around the static component. The SMA actuator wire 302 is fixed at one end to a fixed element 304 of the static component, is provided around pulley wheels 306a-c and is fixed at another end to a connecting element 308. The fixed element 304 and/or connecting element 308 may be crimps or other means of forming an electrical and mechanical connection to the SMA actuator wire 302. The movement of connecting element 308 (as a result of the contraction of each segment of the SMA actuator wire 302) may cause movement of the moveable element in a similar way to that described with reference to FIG. 2.

In embodiments, one or more of the pulley wheels 306a-306c may be replaced by posts (i.e. another type of corner element). The SMA actuator wire 302 may slide around the posts as the wire contracts. The posts may be made of a low friction material or have a low friction material surface coating.

Figure 4:
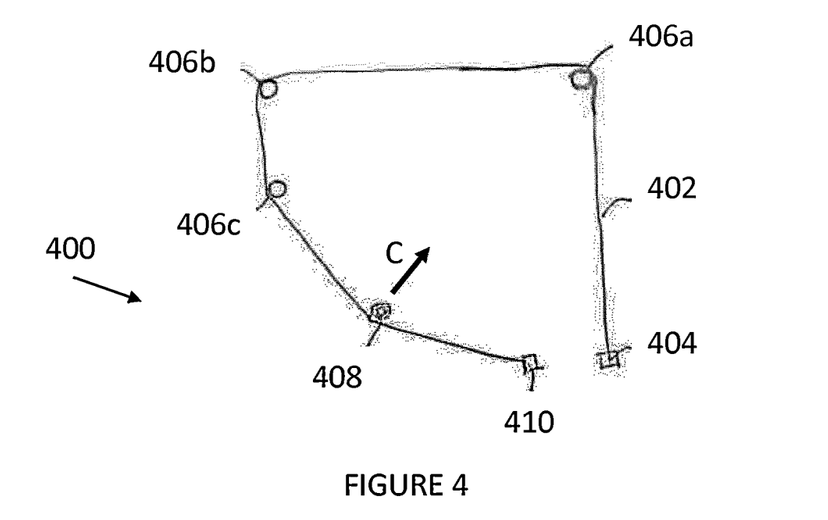
FIG. 4 shows a plan view of a third mechanism for moving a moveable component of an actuator relative to a static component of the type shown in FIG. 1.

FIG. 4 shows a plan view of a third mechanism 400 for moving a moveable component of an actuator relative to a static component 100 of the type shown in FIG. 1. As described with respect to FIG. 3, here a single SMA actuator wire may be wound around three corner elements which take the form of pulley wheels or posts 406a-c. The SMA actuator wire 402 is fixed at one end to a first fixed element 404 of the static component, is provided around pulley wheels 406a-c and is fixed at another end to a second fixed element 410. In this case, a moveable connecting element 408 is provided between pulley wheel/post 406c and fixed element 410. The SMA actuator wire 402 is wound around the moveable connecting element 408, such that the final segment of the SMA actuator wire 402 has a V-shape around the movable connecting element 408. The first and second fixed elements 404, 410 may be crimps or other means of forming an electrical and mechanical connection to the SMA actuator wire 402. Contraction of the SMA actuator wire 402 causes a tightening or straightening of the final V-shaped segment of the wire, which causes the movable connecting element 408 to move in the direction of arrow C. The moveable connecting element 408 may be coupled to the moveable component of the actuator. The movement of connecting element 408 (as a result of the contraction of each segment of the SMA actuator wire 402) may cause movement of the moveable element in a similar way to that described with reference to FIG. 2.

The first and second segments of SMA actuator wire 112a,b may be segments of a single continuous piece of SMA actuator wire.

In embodiments, the corner element mentioned earlier may be a post 306a and the single continuous piece of SMA actuator wire is arranged around the post 306a, wherein contraction of the first segment of SMA actuator wire 302 causes the second segment of SMA actuator wire 302 to slide around the post 306a.

The or each post 306 may be formed of any one of the following: an electrically insulative material, ceramic, plastic, a polymer, an electrically conductive material, a low friction material, and a metal. As the segments of the actuator wire 302 move around the or each post 306, friction may cause the post material to become worn. Thus, it may be advantageous to use a hard material to form the post(s), and preferably a hard and non-conductive material.

The or each post 306 may be covered in a low friction coating and/or in an electrically insulative coating.

In embodiments, the corner element mentioned above may be a pulley wheel 406a and the single continuous piece of SMA actuator wire may be arranged around the pulley wheel 406a, wherein contraction of the first segment of SMA actuator wire causes the second segment of SMA actuator wire to slide around the pulley wheel.

Figure 5:
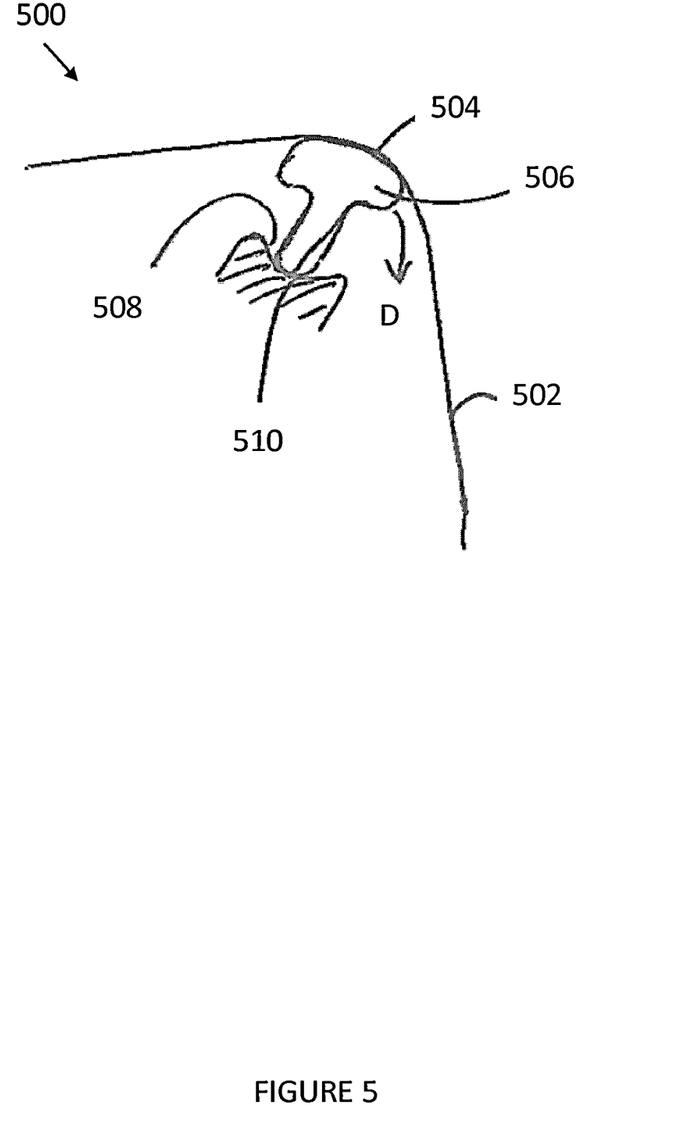
FIG. 5 shows a plan view of a portion of a fourth mechanism for moving a moveable component of an actuator relative to a static component of the type shown in FIG. 1.

FIG. 5 shows a plan view of a portion of a fourth mechanism 500 for moving a moveable component of an actuator relative to a static component 100 of the type shown in FIG. 1. Here, the corner elements of FIG. 1 (i.e. flexures 114a-d and crimp components 118a-c) are replaced by a different type of corner element, i.e. compliant or rocking features. FIG. 5 shows an example rocking feature provided at one corner of the static component 100 in place of the flexure and crimp component of FIG. 1. The rocking feature comprises a T-shaped rocker arm 506, having a bar portion 504 which contacts an SMA actuator wire 502, and an arm portion 510. The SMA actuator wire 502 may pass round an outer surface of the bar portion 504. The arm portion 510 is provided in a curved/concave surface 508. When the SMA actuator wire 502 contracts, the rocker arm bar portion 504 moves in the direction of the arrow D as the rocker arm portion 510 rolls or rocks in the curved surface 508.

In embodiments, the corner element mentioned above may be a rocking arm 506, wherein contraction of the first segment of SMA actuator wire causes displacement of the rocking arm and the second segment of SMA actuator wire.

In embodiments where the actuator is used to move an optical element of an image capture device, the moveable component may comprise or be coupled to an optical element. The optical element may be a filter for filtering particular wavelengths of light or may comprise a shutter/light block. In embodiments, the actuator may comprise multiple moveable components (and potentially multiple corresponding static components or wire arrangements to facilitate the movement of each moveable component), each arranged to move a different optical element relative to aperture 124. For example, one moveable component may be arranged to move a filter, while another may be arranged to move a shutter or light block.

The moveable component may be a thin plate with very little thickness. This may be particularly advantageous where the size of the actuator is important, e.g. in image capture devices or smartphones. In a camera, the moveable component may be provided on/over a lens stack, adding very little to the total camera height. Known SMA actuators used for autofocus (AF) and image shake correction (OIS) typically generate movements of the order of ±100 μm. The actuator described herein, with its extended SMA wire arrangement, may provide a considerably greater movement, of around 400 μm for example. The lever arm mechanism described above may magnify the displacement provided by the SMA actuator wire, such that the magnified displacement may be sufficient to move a shutter or filter out of the optical path—this may require a movement of about 3 mm in a typical camera found in, for example, a smartphone.

Figure 6A:
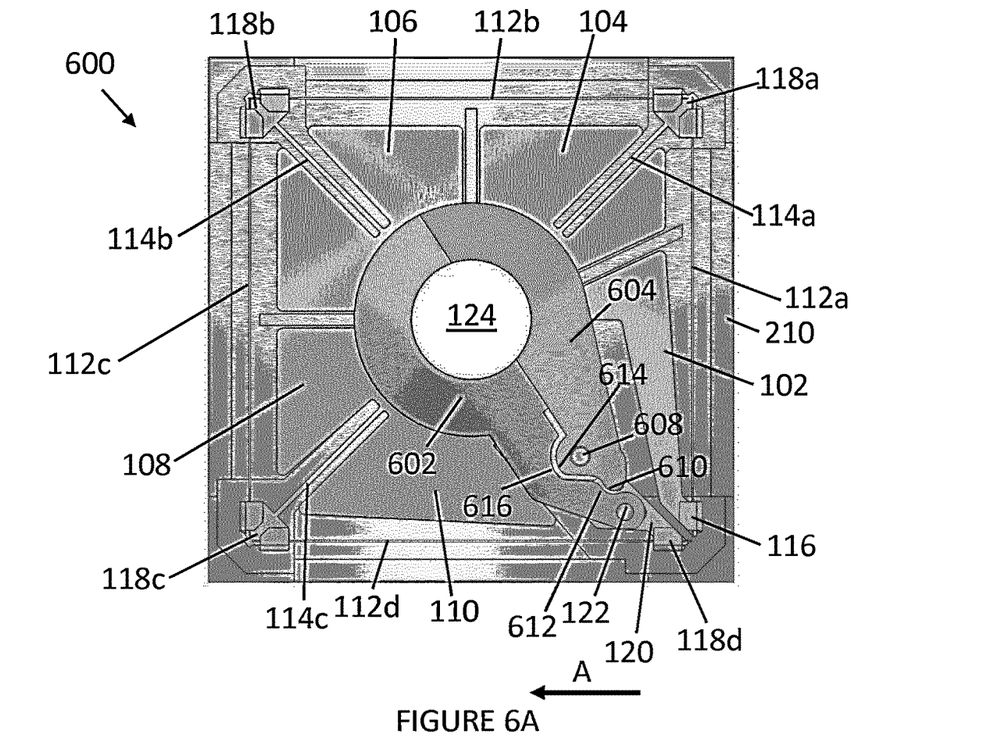
FIG. 6A shows a plan view of a second example moveable component of an actuator where the moveable component is in a closed position.
Figure 6B:
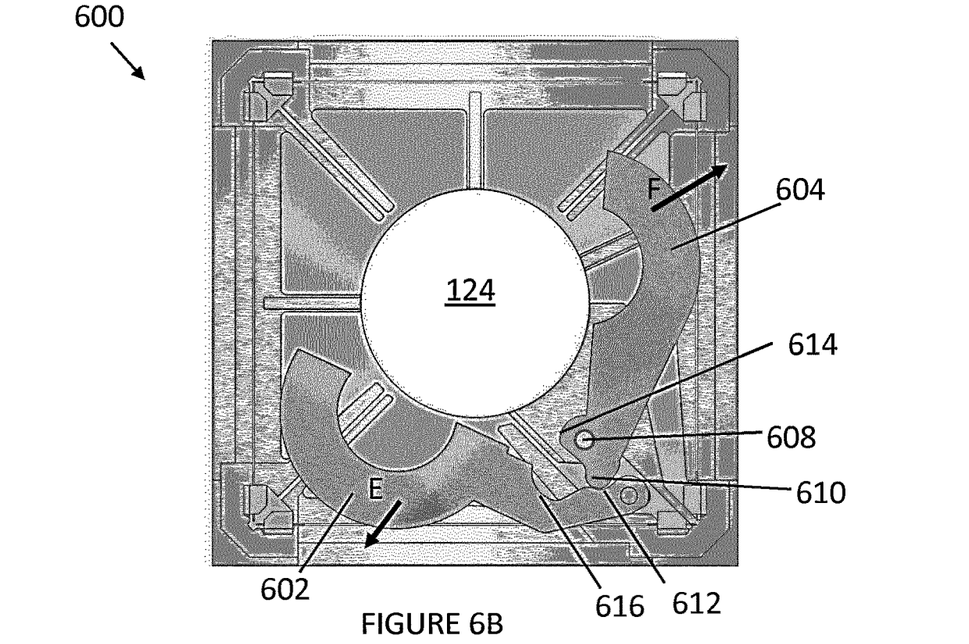
FIG. 6B shows the moveable component of FIG. 6B in an open position.

FIG. 6A shows a plan view of a second example moveable component 600 of an actuator where the moveable component is in a closed position, and FIG. 6B shows the moveable component 600 of FIG. 6B in an open position. The moveable component 600 is coupled to a static component of the type shown in FIG. 1. Thus, for the sake of simplicity, only those features which are new relative to FIG. 1 are described here. The moveable component 600 may be used to control the amount of light which is able to pass through aperture 124. The moveable component 600 comprises first and second u-shaped components 602, 604 that each have arms that are coupleable to pivot posts. Movement of the arms about the pivot posts causes the u-shaped components 602, 604 to be pushed apart to allow more light to pass through aperture 124 (as shown in FIG. 6B).

First U-shaped component 602 comprises a pin (not shown) which may be insertable into slot 122 of flexure 114d. Second U-shaped component 602 may comprise a hole 608 in its arm portion. The substrate 210 may comprise a pivot post (not shown), which extends from the substrate 210 towards the arm portion of U-shaped component 602. The pivot post may locate in hole 608 of the arm portion of U-shaped component 602. The arm portion of the first U-shaped component 602 may comprise two grooves or notches 612 and 616. The arm portion of the second U-shaped component 605 may comprise two protrusions 610 and 614, which are shaped to correspond to the grooves 612, 616 respectively of the first U-shaped component 602. When the segments of SMA actuator wire 112a-d contract, the flexure 114d is caused to move as described above. Slot 122 of the flexure 114d is caused to move, which in turn causes the pin of the first U-shaped component 602 to move. Movement of the pin causes the first U-shaped component 602 to move in the direction indicated by arrow A. As the first U-shaped component 602 moves, it exerts a force on the second U-shaped component 604. In particular the force may be exerted on the protrusions 510 and 614. The force exerted on the second U-shaped component 604 causes it to rotate about the pivot post of substrate 210. The protrusions 610 and 614 are shaped such that they are able to move within the notches 612 and 616. The movement of the second U-shaped component 604 about the pivot post may cause a force to be exerted on the first U-shaped component 602. In particular, the force may be exerted by protrusion 610 onto grove 612. As a result, the first and second U-shaped components 602, 604 may push away from each other in the directions indicated by arrows E and F respectively. In this way, the contraction of the SMA actuator wire segments may allow more light to pass through aperture 124.

Figure 7A:
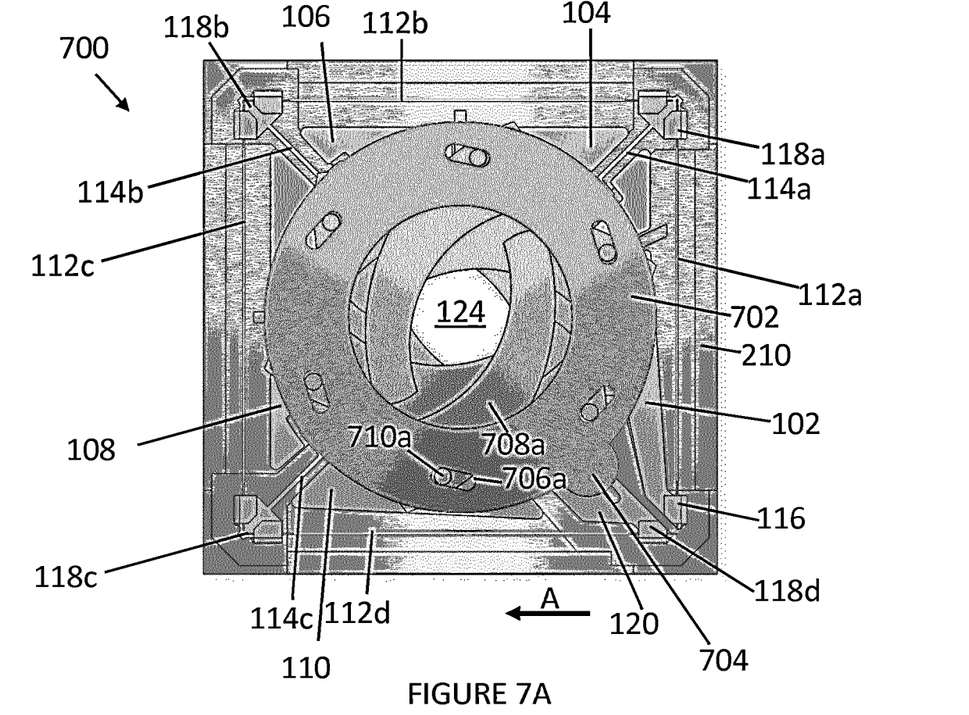
FIG. 7A shows a plan view of another a third example moveable component of an actuator where the moveable component is in a closed position.
Figure 7B:
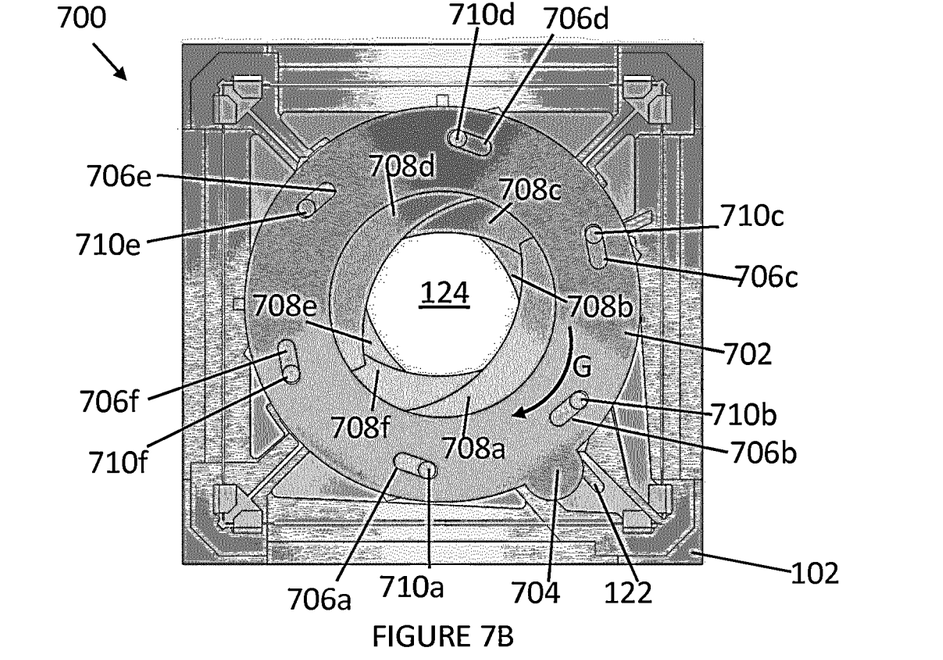
FIG. 7B shows the moveable component of FIG. 7B in an open position.

FIG. 7A shows a plan view of another a third example moveable component 700 of an actuator where the moveable component 700 is in a first open position, and FIG. 7B shows the moveable component 700 of FIG. 7B in a second open position. The moveable component 700 is coupled to a static component of the type shown in FIG. 1. Thus, for the sake of simplicity, only those features which are new relative to FIG. 1 are described here. The moveable component 700 may take the form of a leaf shutter and may be used to control the amount of light which is able to pass through aperture 124. The moveable component 700 comprises a plurality of thin blades 708a-f, which are able to slide over each other in a way which allows the amount of light that passes through aperture 124 to be controlled. The moveable component 700 may be able to fully close/cover the aperture 124 to prevent any light from flowing through, may be able to fully open, and/or may be able to partly open/close to control the amount of light which is able to pass through the aperture 124. The moveable component 700 may be able to assume multiple distinct positions to control the amount of light that is able to pass through aperture 124, as illustrated in FIGS. 7A and 7B for example.

The moveable component 700 may comprise a wheel or torus 702. The wheel 702 may comprise a protrusion 704. A pin (not shown) may be provided on the underside of protrusion 704 and may be insertable into slot 122 of flexure 114d. The wheel 702 may comprise a plurality of slots 706a-f. The number of slots may generally equal the number of blades. In the illustrated example, the moveable component 700 comprises six blades 708a-f, and therefore the wheel 702 comprises six slots 706a-f. Each blade 708a-f comprises a post 710a-f. The blades 708-f may be arranged such that the post of each blade is insertable into one of the slots 706a-f.

When the segments of SMA actuator wire 112a-d contract, the flexure 114d is caused to move as described above. Slot 122 of flexure 114d is caused to move in the direction of arrow A, which in turn causes the pin on the underside of protrusion 704 to move. Movement of the pin causes the wheel 702 to rotate in the direction indicated by arrow G. The rotation of wheel 702 causes the posts 710a-f to move within slots 706a-f, and in turn, this causes the blades 708a-f to change position. The amount by which wheel 702 rotates (and the direction in which the wheel rotates) may dictate the position of blades 708a-f and determine whether the moveable component 700 is fully open, fully closed or partly open.

In each of the above described embodiments, the corner elements of the static component (e.g. a post, pulley wheel, rocking arm, flexure, etc.) may not have any translational motion. For example, the post(s) may be fixed/static posts, and the pulley wheels may be able to rotate about fixed axles, but may be otherwise fixed in position on a corner of the static component so that translational motion is inhibited.

In each of the above described embodiments, the SMA actuator wire may be fixedly coupled at one end to the static component. The SMA actuator wire may be fixedly coupled at a first end to the static component via a crimping component that is couplable to a power supply. The SMA actuator wire may be fixedly coupled at a second end to a moveable element of the static component (as shown in FIG. 2, for example). Alternatively, the SMA actuator wire may be fixedly coupled at a point along the actuator wire to a moveable element of the static component (as shown in FIG. 4, for example). The moveable element may be couplable to the moveable component, such that contraction of the segments of SMA actuator wire additively combine to generate a total contraction that moves the moveable element, thereby moving the moveable component relative to the static component.

The at least one moveable component may be arranged to move an optical element relative to an aperture of the static component. The optical element may be a single leaf shutter (as shown in FIG. 2, for example) or multi-leaf shutter (as shown in FIG. 7A, for example). The optical element may be a filter. The filter may be an infrared cut-off filter, ultraviolet, or a neutral density filter, for example.

In embodiments, the actuator may comprise more than one moveable component. For example, the actuator may comprise a first moveable component arranged to move a first element (e.g. a first optical element relative to an aperture of the static component), and a second moveable component arranged to move a second element (e.g. a second optical element relative to an aperture of the static component). The actuator may comprise a switching mechanism to switch between moving the first moveable component and the second moveable component relative to the aperture.

In embodiments, the actuator may comprise: a first segment of SMA actuator wire provided on a first side of the static component; a second segment of SMA actuator wire provided on a second side of the static component, the second side being adjacent to the first side; a third segment of SMA actuator wire provided on a third side of the static component; and a fourth segment of SMA actuator wire provided on a fourth side of the static component; wherein the first and second segments of SMA actuator wire are mechanically coupled together in series at a first corner of the static component located where the first and second sides meet, the second and third segments of SMA actuator wire are mechanically coupled together in series at a second corner of the static component located where the second and third sides meet, and the third and fourth segments of SMA actuator wire are mechanically coupled together in series at a third corner of the static component located where the third and fourth sides meet.

The static component may comprise a flexure at each of the first, second and third corners, each flexure having a crimping component for mechanically coupling together the segments of SMA actuator wire at the corner. The static component may comprise a flexure at a fourth corner, the flexure comprising an element for coupling to the fourth segment of SMA actuator wire and a further element for couple to the moveable component, wherein contraction of the segments of SMA actuator wire causes bending of the flexures and displacement of the moveable component.

As mentioned earlier, the angle each flexure makes relative to its respective corner may be the same. Alternatively, the angle that one or more flexures makes relative to its respective corner may be different to the other flexures. The angle of the flexure at the fourth corner relative to the fourth corner may be different to the angle the first, second and third flexures make with their respective corners.

In embodiments, the static component may comprise an aperture, and the moveable component may comprise an optical element and may be moveable relative to the static component such that in one position the optical element at least partly covers the aperture.

The actuators described here may be used to move components in any one of: a smartphone, a mobile computing device, a laptop, a table computing device, an consumer electronic device, a security system, a gaming system, an augmented reality system, an augmented reality device, a wearable device, a drone, a vehicle, and an autonomous vehicle.

The present techniques also provide a camera comprising an actuator as described herein.

Further embodiments of the present techniques are set out in the following numbered clauses:
1. An actuator comprising: a support structure with a window; a movable platform holding one or more shutter elements over the window in the support structure; SMA wire on two or more sides of the actuator; SMA wire connected together so that the contraction of the wires is combined; a connection between the SMA wires and the movable platform which amplifies the SMA contraction to move the first shutter element away from the window.
2. The actuator of clause 1 in which the SMA wire is formed of separate wires on two or more sides of the actuator connected at the corners at the end of a flexure.
3. The actuator of clause 1 in which the SMA wire is continuous and wrapped around rotating pulley elements at the corners.
4. The actuator of clause 1 in which the SMA wire is continuous and wrapped around fixed radius features at the corners.
5. The actuator of clause 1 in which the SMA wire is continuous and wrapped around compliant or rocker arm features at the corners.
6. The actuator of clauses 1-4 where the end of the SMA wire or set of wires is connected to the movable platform through a lever mechanism.
7. The actuator of clauses 1-4 where the last section of the SMA is arranged in a V geometry and the centre of the V pushes against the movable platform to amplify the motion.
8. The actuator of clauses 1-7 used in a miniature camera
9. The actuator of clause 8 wherein the shutter element is a shutter or an optical filter.
10. The actuator of clause 8 wherein the shutter element is an infrared cut-off filter.
11. The actuator of clause 8 wherein the actuator switches between two filters, one infrared and one neutral.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:
1. An actuator comprising:
a static component;
at least one moveable component moveable relative to the static component; and
at least one shape memory alloy (SMA) actuator wire coupled to the static component and the moveable component, where a first segment of SMA actuator wire is provided on a first side of the static component, and a second segment of SMA actuator wire is provided on a second side of the static component, the second side being adjacent to the first side;
wherein the first and second segments of SMA actuator wire are mechanically coupled together in series at a corner of the static component located where the first and second sides meet, whereby contraction of the segments of SMA actuator wire additively combine to generate a total contraction that moves the moveable component; and
wherein the at least one moveable component is arranged to move an optical element relative to an aperture of the static component.

2. The actuator as claimed in claim 1, wherein the static component comprises a corner element located at the corner where the first and second sides meet.

3. The actuator as claimed in claim 2, wherein the corner element is a flexure which mechanically couples together the first and second segments of SMA actuator wire at the corner of the static component, wherein contraction of the first segment of SMA actuator wire causes bending of the flexure and displacement of the second segment of SMA actuator wire.

4. The actuator as claimed in claim 3, wherein the flexure comprises a crimping component for mechanically coupling together the first and second segments of SMA actuator wire; or
where the first and second segments of SMA actuator wire are segments of a single continuous piece of SMA actuator wire, and wherein the flexure comprises a clasp portion and the single continuous piece of SMA actuator wire is provided in the clasp portion of the flexure.

5. The actuator as claimed in claim 2, wherein the first and second segments of SMA actuator wire are segments of a single continuous piece of SMA actuator wire.

6. The actuator as claimed in claim 5, wherein the corner element is a post and the single continuous piece of SMA actuator wire is arranged around the post, wherein contraction of the first segment of SMA actuator wire causes the second segment of SMA actuator wire to slide around the post; or
wherein the corner element is a pulley wheel and the single continuous piece of SMA actuator wire is arranged around the pulley wheel, wherein contraction of the first segment of SMA actuator wire causes the second segment of SMA actuator wire to slide around the pulley wheel; or
wherein the corner element is a rocking arm, wherein contraction of the first segment of SMA actuator wire causes displacement of the rocking arm and the second segment of SMA actuator wire.

7. The actuator as claimed in claim 1, wherein the SMA actuator wire is fixedly coupled at one end to the static component.

8. The actuator as claimed in claim 7, wherein the SMA actuator wire is fixedly coupled at a first end to the static component via a crimping component that is couplable to a power supply.

9. The actuator as claimed in claim 8, wherein the SMA actuator wire is fixedly coupled at a second end to a moveable element of the static component.

10. The actuator as claimed in claim 8, wherein the SMA actuator wire is fixedly coupled at a point along the actuator wire to a moveable element of the static component.

11. The actuator as claimed in claim 9, wherein the moveable element is coupleable to the moveable component, such that contraction of the segments of SMA actuator wire additively combine to generate a total contraction that moves the moveable element, thereby moving the moveable component relative to the static component.

12. The actuator as claimed in claim 1, wherein the optical element is a single leaf shutter or multi-leaf shutter.

13. The actuator as claimed in claim 1, wherein the optical element is a filter; and, optionally, wherein the filter is an infrared cut-off filter.

14. The actuator as claimed in claim 1, wherein the at least one moveable component comprises a first moveable component arranged to move a first optical element relative to an aperture of the static component, and a second moveable component arranged to move a second optical element relative to an aperture of the static component.

15. The actuator as claimed in claim 14 further comprising a switching mechanism to switch between moving the first moveable component and the second moveable component relative to the aperture.

16. The actuator as claimed in claim 1 further comprising:
a third segment of SMA actuator wire provided on a third side of the static component; and
a fourth segment of SMA actuator wire provided on a fourth side of the static component; wherein
the first and second segments of SMA actuator wire are mechanically coupled together in series at a first corner of the static component located where the first and second sides meet,
the second and third segments of SMA actuator wire are mechanically coupled together in series at a second corner of the static component located where the second and third sides meet, and
the third and fourth segments of SMA actuator wire are mechanically coupled together in series at a third corner of the static component located where the third and fourth sides meet.

17. The actuator as claimed in claim 16, wherein the static component comprises a flexure at each of the first, second and third corners, each flexure having a crimping component for mechanically coupling together the segments of SMA actuator wire at the corner.

18. The actuator as claimed in claim 17, wherein the static component comprises a flexure at a fourth corner, the flexure comprising an element for coupling to the fourth segment of SMA actuator wire and a further element for couple to the moveable component, wherein contraction of the segments of SMA actuator wire causes bending of the flexures and displacement of the moveable component.

19. The actuator as claimed in claim 18, wherein the angle of the flexure at the fourth corner relative to the fourth corner is different to the angles of the flexures at the first, second, and third corners relative to their respective corners.

20. The actuator as claimed in claim 1, wherein the static component comprises an aperture, and the moveable component comprises an optical element and is moveable relative to the static component such that in one position the optical element at least partly covers the aperture.

* * * * *